(12) United States Patent
Yoneda et al.

(10) Patent No.: US 11,703,278 B2
(45) Date of Patent: Jul. 18, 2023

(54) LIQUEFIED NATURAL GAS COMPRESSION SYSTEM

(71) Applicant: MITSUBISHI HEAVY INDUSTRIES COMPRESSOR CORPORATION, Tokyo (JP)

(72) Inventors: Keizo Yoneda, Houston, TX (US); Peter Clifford Rasmussen, Gilbert, AZ (US); Bernard Quoix, Idron (FR); Takeshi Hataya, Hiroshima (JP); Yoshinori Matsubara, Lake Mary, FL (US)

(73) Assignee: Mitsubishi Heavy Industries Compressor Corporation, Tokyo (JP)

(*) Notice: Subject to any disclaimer, the term of this patent is extended or adjusted under 35 U.S.C. 154(b) by 499 days.

(21) Appl. No.: 16/906,831

(22) Filed: Jun. 19, 2020

(65) Prior Publication Data

US 2021/0396464 A1 Dec. 23, 2021

(51) Int. Cl.
*F25J 1/02* (2006.01)
*F25J 1/00* (2006.01)
*F01K 17/00* (2006.01)
*F01K 23/10* (2006.01)

(52) U.S. Cl.
CPC .............. *F25J 1/0283* (2013.01); *F01K 17/00* (2013.01); *F01K 23/10* (2013.01); *F25J 1/0022* (2013.01); *F25J 1/0282* (2013.01)

(58) Field of Classification Search
CPC ........ F25J 1/0283; F25J 1/0022; F25J 1/0282; F25J 1/0242; F25J 2240/70; F25J 2240/82; F25J 1/0247; F25J 1/0289; F25J 1/029; F01K 17/00; F01K 23/10; Y02P 80/15

USPC .................................... 60/39.182, 670–681
See application file for complete search history.

(56) References Cited

U.S. PATENT DOCUMENTS

| | | | |
|---|---|---|---|
| 6,691,531 B1 | 2/2004 | Martinez et al. | |
| 10,126,048 B2 | 11/2018 | Nagao et al. | |
| 2012/0131950 A1 | 5/2012 | Kolscheid et al. | |
| 2012/0324861 A1 | 12/2012 | Kolscheid et al. | |
| 2014/0250911 A1* | 9/2014 | Huntington | F25J 1/025 60/39.5 |
| 2018/0038638 A1* | 2/2018 | Guillard | F25J 1/0225 |
| 2018/0038642 A1* | 2/2018 | Roesch | C01B 3/56 |

FOREIGN PATENT DOCUMENTS

| | | |
|---|---|---|
| JP | 5241719 B2 | 7/2013 |
| JP | 5976951 B2 | 8/2016 |
| WO | 2010-063789 A2 | 6/2010 |

* cited by examiner

*Primary Examiner* — Hoang M Nguyen
(74) *Attorney, Agent, or Firm* — Osha Bergman Watanabe & Burton LLP

(57) ABSTRACT

A liquefied natural gas compression system includes: a first gas turbine that drives a rotary machine; a first steam boiler including a first heat recovery steam generator that recovers heat from exhaust gas from the first gas turbine; a first steam turbine that drives a first refrigerant compressor; a common header steam line through which steam from the first steam boiler flows to an inlet of the first steam turbine; an auxiliary steam line; and a letdown valve that connects the common header steam line to the auxiliary steam line and that opens in response to pressure of the common header steam line exceeding a predetermined threshold value.

13 Claims, 4 Drawing Sheets

LIQUEFIED NATURAL GAS COMPRESSION SYSTEM

TECHNICAL FIELD

The present invention relates to a liquefied natural gas compression system.

BACKGROUND

Liquefied natural gas (LNG) is natural gas that has cooled to liquid form. The transformation of natural gas into liquid requires compression of the natural gas and cooling of the compressed natural gas. To provide power for those processes, a gas turbine may be typically used.

In conventional LNG plant designs, exhaust gases from the gas turbine flare into the atmosphere from its exhaust stack. Some designs utilize heat recovery systems at gas turbine exhausts, in which heat is usually transferred into a system to produce either hot oil or steam. This heat recovery system is known either as a "Waste Heat Recovery System" (WHRU) to produce hot oil for the process or as a "Heat Recovery Steam Generator" (HRSG) to produce steam. In both cases, such a system improves the overall thermal efficiency and minimizes pollutant emissions including but not limited to CO, $CO_2$, and $NO_x$ from the gas turbine. In conventional LNG plants, the steam from the HRSG can be used as an energy source, supplied to a steam turbine to drive rotating equipment such as non-refrigeration compressors, generators, and pumps.

SUMMARY

One or more embodiments of the invention minimize the carbon footprint of LNG compression systems by efficiently combining the Brayton and Rankine thermodynamic cycles while minimizing required equipment. One or more embodiments also allow use of residual steam and or other heating mediums such as hot oil systems to further improve thermal efficiencies hence further reduce carbon footprint for the liquefaction process and associated plant auxiliaries.

In one or more embodiments, gas turbines are mechanically coupled to refrigeration compressors and steam turbines are mechanically coupled to similar refrigeration compressors and powered from the exhaust energy from the gas turbines.

According to one or more embodiments, utilizing the steam turbines for refrigeration driver service greatly reduces the amount of fuel required in the system, thereby reducing the carbon footprint. Further, this reduced carbon footprint is independent of the liquefaction refrigeration process utilized.

Furthermore, one or more embodiments advantageously use steam generated in the HRSGs (installed in the exhaust of the gas turbines that drive refrigeration compressors) as the primary steam source to drive additional refrigeration compressors with their associated steam turbines. This can provide advantages such as:

maximizing overall LNG plant efficiency;
minimizing the number of gas turbine drivers in LNG plants as well as pollutant emission from the gas turbines;
reducing the size of installation footprint;
reducing the capital expenditure; and
maintaining cryogenic condition during upset conditions through use of a common steam system.

According to one or more embodiments of the present invention, a liquefied natural gas compression system includes: a first gas turbine that drives a rotary machine; a first steam boiler including a first heat recovery steam generator that recovers heat from exhaust gas from the first gas turbine; a first steam turbine that drives a first refrigerant compressor; a common header steam line through which steam from the first steam boiler flows to an inlet of the first steam turbine; an auxiliary steam line; and a letdown valve that connects the common header steam line to the auxiliary steam line and that opens in response to pressure of the common header steam line exceeding a predetermined threshold value.

The liquefied natural gas compression system according to one or more embodiments further includes: a check valve that connects the common header steam line to the auxiliary steam line in parallel to the letdown valve.

In the liquefied natural gas compression system according to one or more embodiments, the check valve opens in response to pressure of the auxiliary steam line exceeding pressure of the common header steam line.

In the liquefied natural gas compression system according to one or more embodiments, the letdown valve opens and allows steam from the auxiliary steam line to flow to the common header steam line in response to pressure of the auxiliary steam line exceeding pressure of the common header steam line.

In the liquefied natural gas compression system according to one or more embodiments, the rotary machine includes a second refrigerant compressor.

The liquefied natural gas compression system according to one or more embodiments further includes: a second gas turbine that drives a second refrigerant compressor; and a second steam boiler including a second heat recovery steam generator that recovers heat from exhaust gas from the second gas turbine. The common header steam line is connected to a steam outlet of the second steam boiler.

The liquefied natural gas compression system according to one or more embodiments further includes: a second gas turbine that drives a second refrigerant compressor, and the first heat recovery steam generator recovers heat from exhaust gas from the second gas turbine.

The liquefied natural gas compression system according to one or more embodiments further includes: a second steam turbine that drives a second refrigerant compressor. The common header steam line is connected to an inlet of the second steam turbine.

In the liquefied natural gas compression system according to one or more embodiments, at least one of either the first refrigerant compressor and the second refrigerant compressor includes a barrel type compressor unit.

In the liquefied natural gas compression system according to one or more embodiments, the first heat recovery steam generator includes a furnace.

Other aspects and advantages of the invention will be apparent from the following description and the appended claims.

DETAILED DESCRIPTION

Specific embodiments will now be described in detail with reference to the accompanying figures.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description. For example, similar or identical components in the various embodiments may be denoted with the same reference numbers, and redundant explanations are omitted.

Throughout the application, ordinal numbers (e.g., first, second, third, etc.) may be used as an adjective for an element (i.e., any noun in the application). The use of ordinal numbers does not imply or create a particular ordering of the elements or limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a horizontal beam" includes reference to one or more of such beams.

Terms such as "approximately," "substantially," etc., mean that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

Although multiple dependent claims are not introduced, it would be apparent to one of ordinary skill in that the subject matter of the dependent claims of one or more embodiments may be combined with other dependent claims.

Figure 1:
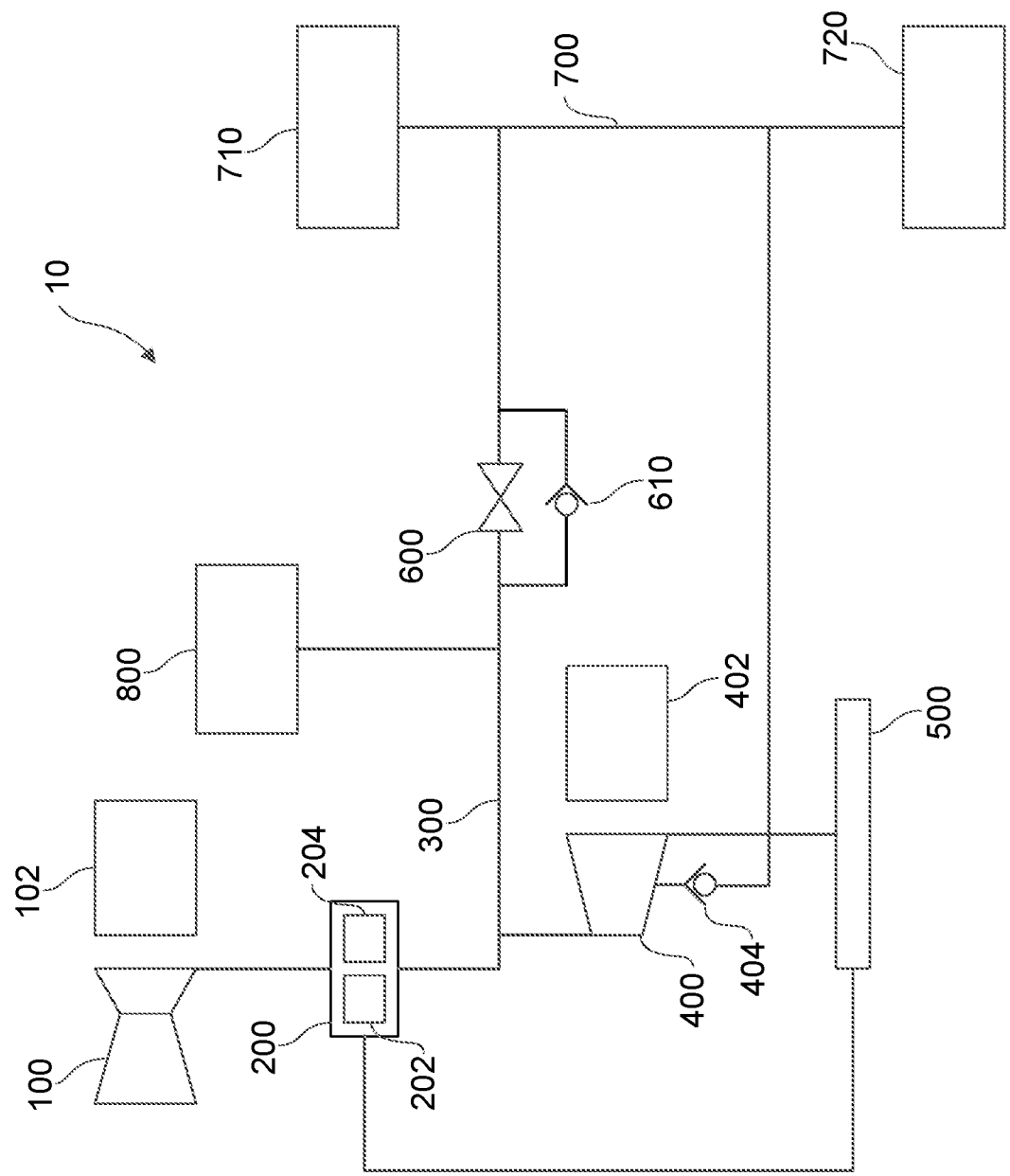
FIG. 1 shows a schematic diagram of a liquefied natural gas compression system according to one or more embodiments of the present invention.

FIG. 1 shows a schematic diagram of liquefied natural gas compression system 10 according to one or more embodiments of the invention. In this example, Gas turbine 100 (example of "first gas turbine") in liquefied natural gas compression system 10 converts thermal energy of operating gas into rotation energy and drives rotary machine (load) 102. Rotary machine 102 may be, for example, a refrigerant compressor used to liquefy natural gas and/or a power generator that generates electric power. Although not shown, two or more rotary machines 102 may be driven by gas turbine 100. When gas turbine 100 drives two or more rotary machines 102, gas turbine 100 and two or more rotary machines 102 may have their rotational axes connected in series (same shaft line). Alternatively, driving power of gas turbine 100 may be transmitted to one or more rotary machines 102 via a power transmission mechanism such as gears.

Continuing with the example in FIG. 1, exhaust gas from gas turbine 100 is provided to boiler 200 (example of "first steam boiler") in which a heat regeneration steam generator (HRSG) 202 (example of "first heat recovery steam generator") recovers thermal energy (i.e., heat) from the exhaust gas and generates steam. Boiler 200 may also include furnace 204 such as an internal burner to add heat to the steam.

Boiler 200 outputs steam to steam turbine 400 (example of "first steam turbine") via common header steam line 300. Steam turbine 400 converts thermal energy of the steam into rotation energy and drives rotary machine (load) 402. Rotary machine 402 may be, for example, a refrigerant compressor (example of "first refrigerant compressor") used to liquefy natural gas or a power generator that generates electric power. Although not shown, two or more rotary machines 402 may be driven by steam turbine 400. When steam turbine 400 drives two or more rotary machines 402, steam turbine 400 and two or more rotary machines 402 may have their rotational axes connected in series (same shaft line). Alternatively, driving power of steam turbine 400 may be transmitted to one or more rotary machines 402 via a power transmission mechanism such as gears.

Steam turbine 400 can be started up after gas turbine 100 is operated and steam is generated from HRSG 202. In case rotary machine (load) 402 needs to be in operation prior the rotary machine (load) 102, gas turbine 100 can be started up and rotary machine (load) 102 can bypass from the service. For example, when rotary machine 102 is a compressor, rotary machine 102 is put in recycle operation. After steam turbine 400 started up and rotary machine (load) 402 is put in service, rotary machine 102 is put back into the service.

In the case that rotary machine 102 is a compressor, the compressor includes a compressor body, a suction line that supplies gas to the compressor body, and a discharge line that discharges gas from the compressor body. The compressor also includes a bypass line connected to the suction line and discharge line such that the gas circulates from the discharge line to the suction line. An anti-surge valve is disposed on the bypass line. When the compressor is put in service, the anti-surge valve is close. And when the compressor is put in recycle operation, the anti-surge valve is open and the gas discharged from the compressor body is circulated to the suction line via the bypass line.

A steam outlet of steam turbine 400 could be connected to steam condensing system (condenser) 500. When steam turbine 400 is connected to the steam condensing system 500, water recovered from steam by condensing system 500 is circulated to boiler 200 as liquid water to be reused in boiler 200.

Steam turbine 400 may have a steam extraction. Steam extracted from steam turbine 400 may be guided to auxiliary steam line 700 and supplied to steam users 720 that are connected to auxiliary steam line 700. By providing a check valve 404, steam can be extracted only when steam at the extraction port has pressure higher than pressure of auxiliary steam line 700 or pressure higher than a predetermined threshold.

Still referring to FIG. 1, auxiliary steam source 710 is connected to auxiliary steam line 700 and used to provide steam when no steam is extracted from steam turbine 400. In other words, auxiliary steam source 710 and steam users 720 that are connected together via auxiliary steam line 700 may constitute a separate system that uses steam. Thus, liquefied natural gas compression system 10 according to one or more embodiments of the invention may include an existing steam system in a retrofitting manner.

In the example shown in FIG. 1, common header steam line 300 is also connected to auxiliary steam line 700 via letdown valve 600 used to regulate pressure of common header steam line 300. Letdown valve 600 opens when the pressure of common header steam line 300 exceeds a predetermined threshold so that excess steam in common header steam line 300 is released into auxiliary steam line 700. As a result, common header steam line 300 and other components connected thereto can be protected from excessive pressure of the steam. Furthermore, by connecting letdown valve 600 to auxiliary stem line 700, energy in excess steam in common header steam line 300 can be utilized more efficiently compared to a configuration in which the excess steam is simply dissipated to atmosphere.

Further still, in the example shown in FIG. 1, supplemental steam source 800 is connected to common header steam line 300. With this configuration, steam turbine 400 may function even when boiler 200 with HRSG 202 is not in operation. In case the HRSG 202 is not in operation, gas turbine 100 can maintain the operation by bypassing the HRSG 202. Check valve 610 is optionally provided between common header steam line 300 and auxiliary steam line 700 in parallel to letdown valve 600. Check valve 610 opens when the pressure of common header steam line 300 is lower than the pressure of auxiliary steam line 700. By opening check valve 610, steam in auxiliary steam line 700 can flow into common header steam line 300 and causes steam turbine 400 to function even when boiler 200 with HRSG 202 is not in operation. Instead of using check valve 610, letdown valve 600 may be controlled to open when common header steam line 300 has lower pressure than auxiliary steam line 700.

Figure 2:
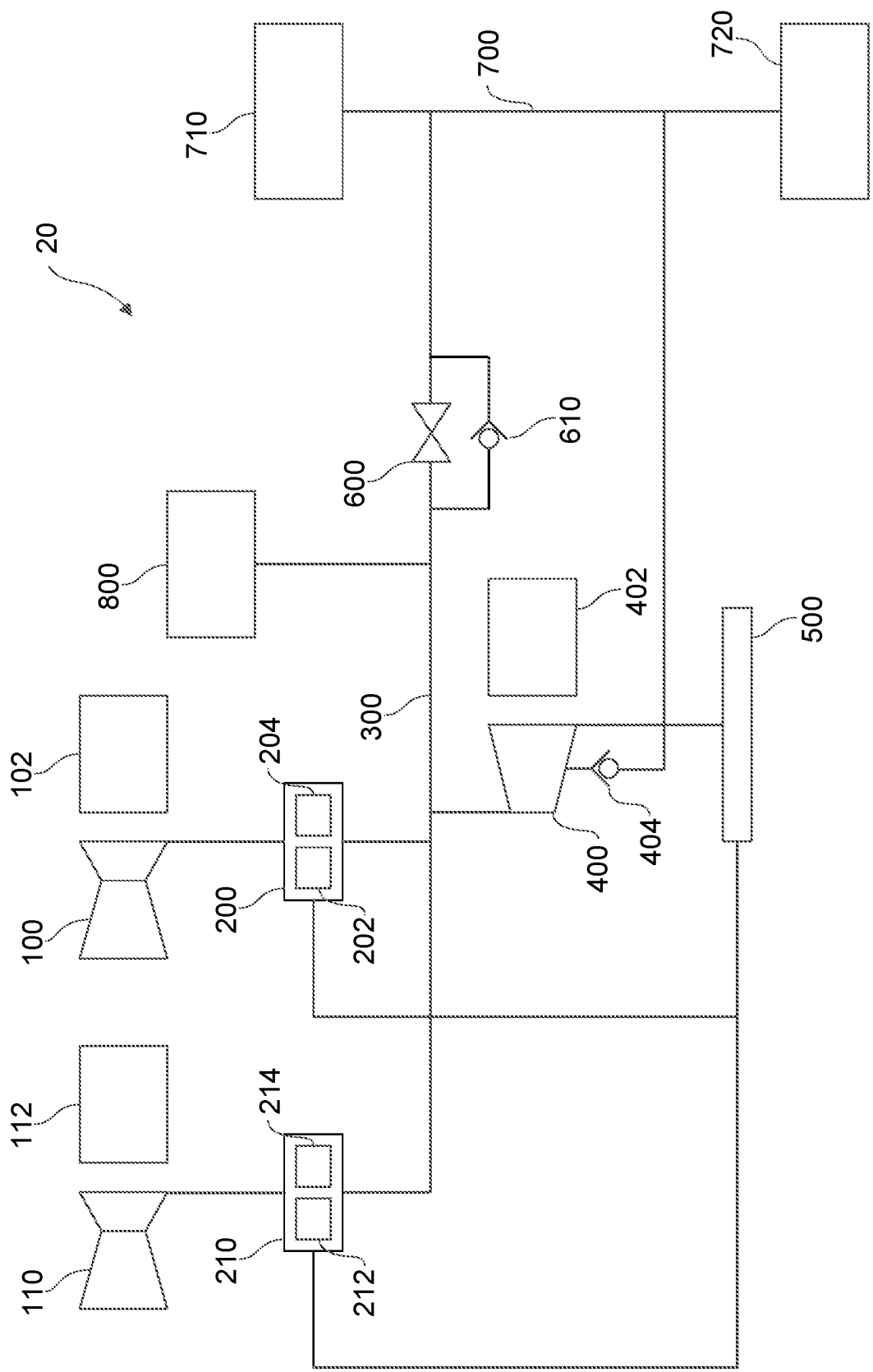
FIG. 2 shows another schematic diagram of a liquefied natural gas compression system according to one or more embodiments of the present invention in which multiple gas turbines are used with multiple boilers.

FIG. 2 shows a schematic diagram of liquefied natural gas compression system 20 according to one or more embodiments of the invention. When compared to liquefied natural gas compression system 10 shown in FIG. 1, liquefied natural gas compression system 20 has additional gas turbine 110 (example of "second gas turbine") and boiler 210 (example of "second steam boiler") that includes HRSG 212 (example of "second heat recovery steam generator") and optional furnace 214. In case HRSG 202 and/or HRSG 212 is not in operation, the dedicated gas turbine 100 and/or gas turbine 110 can maintain the operation by bypassing the HRSG. Gas turbine 110 also converts thermal energy of operating gas into rotation energy and drives rotary machine (load) 112. Rotary machine 112 may be a refrigerant compressor (example of "second refrigerant compressor") used to liquefy natural gas and/or a power generator that generates electric power. As with rotary machine 102, two or more rotary machines 112 may be driven by gas turbine 110 via connection of their rotational axes in series (same shaft line) or via a power transmission mechanism such as gears.

Steam turbine 400 can be started up after gas turbine 100 and/or gas turbine 110 is operated and steam is generated from HRSG 202 and/or HRSG 212. In case rotary machine (load) 402 needs to be in operation prior to the rotary machine (load) 102 and/or rotary machine (load) 112, gas turbine 100 and/or gas turbine 110 can be started up and rotary machine (load) 102 and/or rotary machine (load) 112 can bypass from the service. For example, when rotary machine 102 is a compressor, the rotary machine 102 is put in recycle operation. After steam turbine 400 is started up and rotary machine (load) 402 is put in service, rotary machine 102 and/or rotary machine 112 is put back into the service.

In the example shown in FIG. 2, exhaust gas of gas turbine 110 is provided to boiler 210, and steam output from boiler 210 is guided to common header steam line 300 and used to drive steam turbine 400.

Other components of liquefied natural gas compression system 20 shown in FIG. 2 may be similar or identical to those of liquefied natural gas compression system 10.

Figure 3:
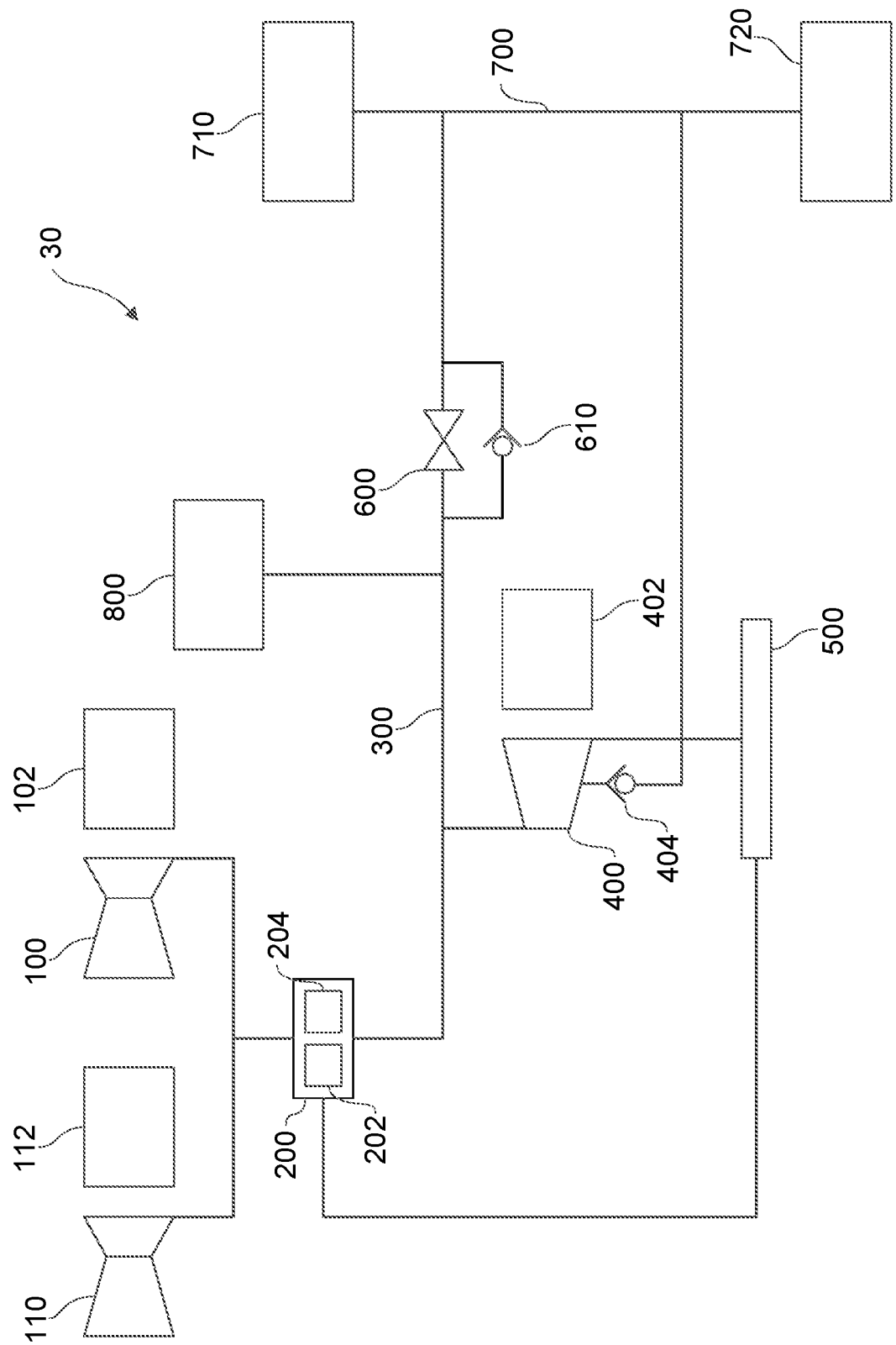
FIG. 3 shows another schematic diagram of a liquefied natural gas compression system according to one or more embodiments of the present invention in which multiple gas turbines are used with a single boiler.

FIG. 3 shows a schematic diagram of liquefied natural gas compression system 30 according to one or more embodiments of the invention. When compared to the diagram of liquefied natural gas compression system 20 shown in FIG. 2, liquefied natural gas compression system 30 has only one boiler 200 connected to gas turbines 100 and 110. As shown in FIG. 3, exhaust gas from gas turbine 110 may be mixed together with exhaust gas from gas turbine 100 before entering boiler 200. In this case, only one HRSG 202 may be used in boiler 200. Further, boiler 200 may include only one optional furnace 204. In case HRSG 202 is not in operation, gas turbine 100 and gas turbine 110 can maintain the operation by bypassing the HRSG.

Alternatively, exhaust gas from gas turbine 110 may be guided into boiler 200 separately from exhaust gas from gas turbine 100. In this case, boiler 200 may have two separate HRSGs (not shown) inside and each HRSG generates steam using exhaust gas from a corresponding gas turbine. Boiler 200 may have two separate furnaces (not shown) for respective HRSGs or one furnace (such as furnace 204) in boiler 200 may be commonly used with two HRSGs.

Steam turbine 400 can be started up after gas turbine 100 and/or gas turbine 110 is operated and steam is generated from HRSG 202. In case rotary machine (load) 402 needs to be in operation prior to the rotary machine (load) 102 and/or rotary machine (load) 112, gas turbine 100 and/or gas turbine 110 can be started up and rotary machine (load) 102 and/or rotary machine (load) 112 can bypass from the service. For example, when rotary machine 102 is a compressor, rotary machine 102 is put in recycle operation. After steam turbine 400 is started up and rotary machine (load) 402 is put in service, rotary machine 102 and/or rotary machine 112 is put back into the service.

Other components of liquefied natural gas compression system 30 shown in FIG. 3 may be similar or identical to those of liquefied natural gas compression system 20.

Figure 4:
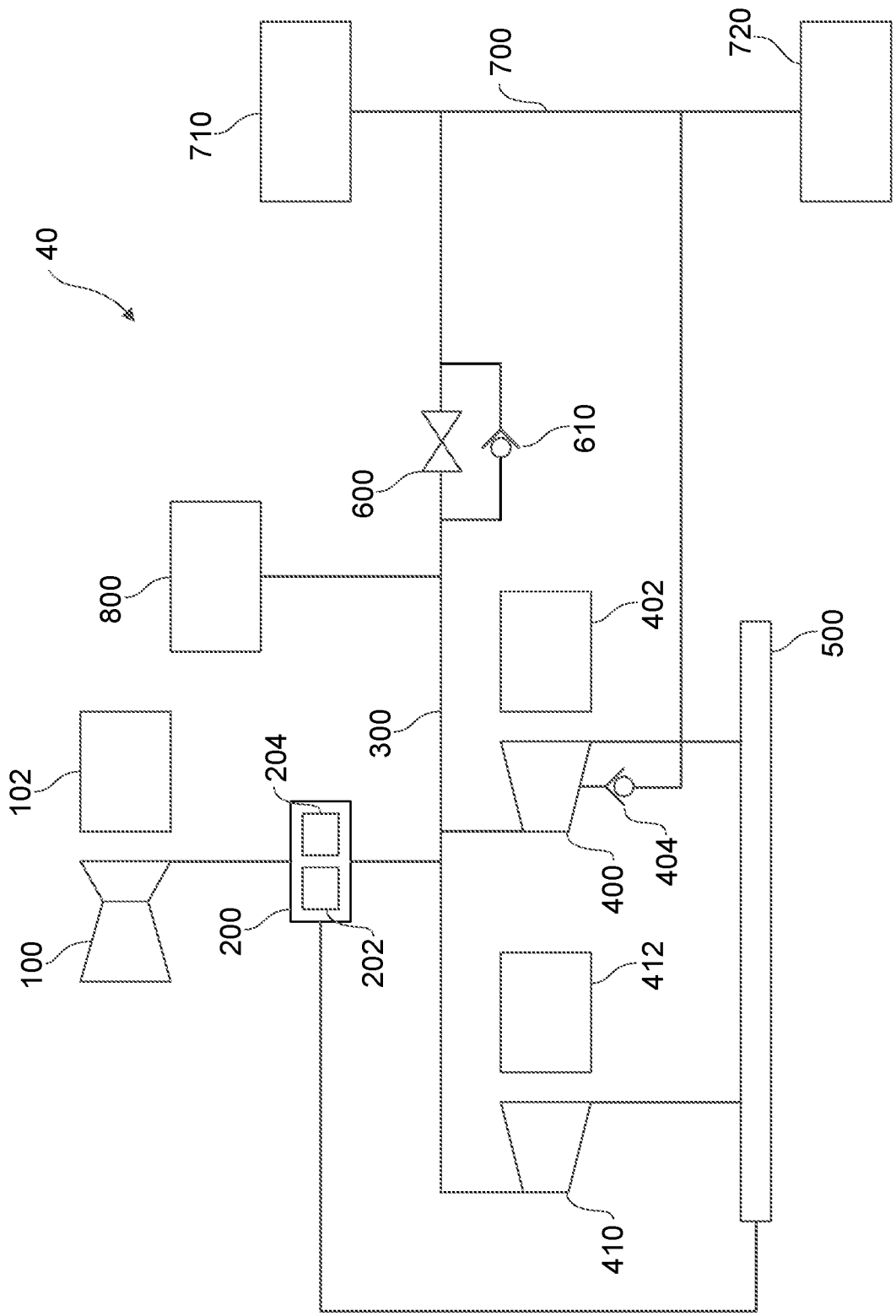
FIG. 4 shows another schematic diagram of a liquefied natural gas compression system according to one or more embodiments of the present invention in which multiple steam turbines are used.

FIG. 4 shows a schematic diagram of liquefied natural gas compression system 40 according to one or more embodiments of the invention. When compared to the diagram of liquefied natural gas compression system 10 shown in FIG. 1, liquefied natural gas compression system 40 has additional steam turbine 410 (example of "second steam turbine") connected to common header steam line 300. Steam turbine 410 converts thermal energy of the steam from common header steam line 300 into rotation energy and drives rotary machine (load) 412. In case HRSG 202 is not in operation, gas turbine 100 can maintain the operation by bypassing the HRSG. Rotary machine 412 can be, for example, a refrigerant compressor (another example of "second refrigerant compressor") used to liquefy natural gas or a power generator that generates electric power. Two or more rotary machines 412 may be driven by steam turbine 410 via connection of their rotational axes in series (same shaft line) or via a power transmission mechanism such as gears.

Steam turbine 400 and steam turbine 410 can be started up after gas turbine 100 is operated and steam is generated from HRSG 202. In case rotary machine (load) 402 and/or rotary machine (load) 412 needs to be in operation prior to the rotary machine (load) 102, gas turbine 100 can be started up and rotary machine (load) 102 can bypass from the service. For example, when rotary machine 102 is a compressor, rotary machine 102 is put in recycle operation. After steam turbine 400 and/or steam turbine 410 is started up and rotary machine (load) 402 and/or rotary machine (load) 412 is put in service, rotary machine 102 is put back into the service.

In the example shown in FIG. 4, no steam is extracted from steam turbine 410. In other words, all of the steam guided to steam turbine 410 is used for driving rotary machine 412. However, as well as steam turbine 400, some of the steam may be extracted from steam turbine 410 and fed to auxiliary steam line 700.

One or more embodiments of the invention may have one or more of the following advantages:

One or more embodiments of the invention minimize the carbon footprint of LNG refrigeration compression systems through efficiently combining the Brayton and Rankine thermodynamic cycles while minimizing required equipment. One or more embodiments also allow use of residual steam and/or other heating mediums such as hot oil systems to further improve thermal efficiencies hence further reduce carbon footprint for the liquefaction process and associated plant auxiliaries. For example, one or more embodiments allow utilization of residual thermal energy in the exhaust gas of one or more gas turbines 100, 110 as steam output from boiler 200, 210 with HRSGs 202, 212, rather than letting the energy dissipate into atmosphere with the exhaust gas. Then, the energy recovered from the exhaust gas and captured as steam may be used to operate steam turbines 400, 410 or provided to an auxiliary system via auxiliary steam line 700. Further, one or more embodiments reduce the total thermal energy dumped to the atmosphere with exhaust gas from gas turbines 100, 110. Consequently, for the same amount of energy output of the overall system, the liquefied natural gas compression system 10, 20, 30, 40 according to one or more embodiments reduce the total number of gas turbines 100, 110 used in the system.

In one or more embodiments, gas turbines are mechanically coupled to refrigeration compressors and steam turbines are mechanically coupled to similar refrigeration compressors and powered from the exhaust energy from the gas turbines. Utilizing the steam turbines for refrigeration driver service greatly reduces the amount of fuel required to be burned in the system, reducing the carbon footprint. This reduced carbon footprint is independent of the liquefaction refrigeration process utilized.

Because gas turbines are expensive relative to other sources of rotation energy such as steam turbines, one or more embodiments can reduce the overall cost of the system. Furthermore, because steam turbine footprint size is smaller than gas turbine, one or more embodiments can reduce the installation footprint. Furthermore, due to a smaller number of gas turbines, one or more embodiments can also reduce the amount of fuel consumed by gas turbines as well as potential air pollution and carbon footprint of the system.

In liquefied natural gas compression system 10, 20, 30, 40 according to one or more embodiments, two or more of turbines (gas turbines 100, 110 and steam turbines 400, 410) are available as sources of rotation energy to drive rotary machines 102, 112, 402, 412. In general, steam turbines can operate for longer periods between maintenance than gas turbines. Therefore, compared to a configuration in which only gas turbines are used, scheduling of maintenance work for all turbines becomes easier and more flexible and at least one turbine can be kept in operation even when the other turbines are under maintenance. Further, when refrigerant compressors are used as rotary machines 102, 112, 402, 412, by scheduling maintenance of these turbines, at least one refrigerant compressor may be in operation so LNG is produced without interruption. This continuous production of LNG may mitigate storage of LNG in the production plant. Furthermore, cryogenic condition of the refrigeration system may be continuously maintained and restart procedures of a combination of the turbine and the refrigerant compressor after maintenance work may be mitigated.

In addition, by having multiple turbines, one or more embodiments can provide increased flexibility in designing system configurations with respect to different types of compressors. For example, a barrel-type compressor may be used to compress natural gas due to its higher discharge pressure. However, when maintenance is performed on a barrel-type compressor, a rotor assembly (or a bundle) may be pulled out from the casing in the direction of the centerline of the rotor assembly. Therefore, a barrel-type compressor may be installed only at an end of a driving axis when two or more rotary machines are directly driven by a turbine. Use of combined cycle mechanism may mitigate this limitation in using barrel-type compressors, which are driven around an axis that is different from an axis of a turbine. In addition, one or more embodiments with multiple turbines (gas and/or steam turbines) may allow the adoption of many barrel-type compressors while keeping enough maintenance space around the barrel-type compressors.

Although the disclosure has been described with respect to only a limited number of embodiments, those skilled in the art, having benefit of this disclosure, will appreciate that various other embodiments may be devised without departing from the scope of the invention. Accordingly, the scope of the invention should be limited only by the attached claims.

What is claimed is:

1. A liquefied natural gas compression system, comprising:
    a first gas turbine that drives a rotary machine;
    a first steam boiler comprising a first heat recovery steam generator that recovers heat from exhaust gas from the first gas turbine;
    a first steam turbine that drives a first refrigerant compressor;
    a common header steam line through which steam from the first steam boiler flows to an inlet of the first steam turbine;
    an auxiliary steam line; and
    a letdown valve that connects the common header steam line to the auxiliary steam line and that opens in response to pressure of the common header steam line exceeding a predetermined threshold value.

2. The liquefied natural gas compression system according to claim 1, further comprising:
    a check valve that connects the common header steam line to the auxiliary steam line in parallel to the letdown valve.

3. The liquefied natural gas compression system according to claim 2, wherein the check valve opens in response to pressure of the auxiliary steam line exceeding pressure of the common header steam line.

4. The liquefied natural gas compression system according to claim 1, wherein the letdown valve opens and allows steam from the auxiliary steam line to flow to the common header steam line in response to pressure of the auxiliary steam line exceeding pressure of the common header steam line.

5. The liquefied natural gas compression system according to claim 1, wherein the rotary machine comprises a second refrigerant compressor.

6. The liquefied natural gas compression system according to claim 5, wherein at least one of the first refrigerant compressor and the second refrigerant compressor comprises a barrel type compressor unit.

7. The liquefied natural gas compression system according to claim 1, further comprising:
a second gas turbine that drives a second refrigerant compressor; and
a second steam boiler comprising a second heat recovery steam generator that recovers heat from exhaust gas from the second gas turbine, wherein
the common header steam line is connected to a steam outlet of the second steam boiler.

8. The liquefied natural gas compression system according to claim 7, wherein at least one of the first refrigerant compressor and the second refrigerant compressor comprises a barrel type compressor unit.

9. The liquefied natural gas compression system according to claim 1, further comprising:
a second gas turbine that drives a second refrigerant compressor, wherein
the first heat recovery steam generator recovers heat from exhaust gas from the second gas turbine.

10. The liquefied natural gas compression system according to claim 9, wherein at least one of the first refrigerant compressor and the second refrigerant compressor comprises a barrel type compressor unit.

11. The liquefied natural gas compression system according to claim 1, further comprising:
a second steam turbine that drives a second refrigerant compressor, wherein
the common header steam line is connected to an inlet of the second steam turbine.

12. The liquefied natural gas compression system according to claim 11, wherein at least one of the first refrigerant compressor and the second refrigerant compressor comprises a barrel type compressor unit.

13. The liquefied natural gas compression system according to claim 1, wherein the first heat recovery steam generator comprises a furnace.

* * * * *